Patented Feb. 7, 1928.

1,658,544

UNITED STATES PATENT OFFICE.

MERRILL ARTHUR YOUTZ, OF CHICAGO, ILLINOIS, ASSIGNOR, BY MESNE ASSIGNMENTS, TO GENERAL MOTORS CORPORATION, OF DETROIT, MICHIGAN, A CORPORATION OF DELAWARE.

PROCESS OF MAKING LEAD ALKYLS.

No Drawing. Application filed September 7, 1923. Serial No. 661,515.

This invention relates to modes of producing alkyl compounds of lead and is directed particularly to the synthesis of lead tetraethyl. The principal object of the present invention is to employ alkyl chlorides as the alkylating agent.

This mode comprises broadly, combining lead with an alkyl radical by causing the lead to react with an alkyl chloride through submitting an intimate mixture of these substances to a process of reduction and, if desired, promoting the reaction with a catalyst.

By way of an example of one manner of carrying out my process I may form a sodium lead alloy $Na_4Pb$ (containing about 31% sodium), and place, by weight, 6 parts of this alloy, 6 parts of ethyl chloride, and 1 part of ethyl acetate in a closed vessel, which may be equipped with an agitator, the ethyl acetate being added slowly, a period of addition of about sixteen hours being preferred. The ethyl acetate is present in the proportion of about 1 mol. to 7 mols. of sodium. Good results have been obtained by putting all the ethyl acetate in the reaction chamber at the beginning of the process. The capacity of the chamber may be about two times the volume of the substances employed.

The vessel is heated to about 60° C. producing a pressure of about 5 atmospheres, which pressure is sufficient to maintain a substantial part of the ethyl chloride in a liquid state and in contact with the other substances of the reaction mass. Apparently the sodium and ethyl acetate react yielding active or nascent hydrogen which reduces the ethyl chloride and the lead combines with the ethyl group forming lead diethyl which is thermally decomposed into lead tetra ethyl and lead. The lead tends to settle to the bottom of the vessel.

The yield is materially increased by so timing the reactions that one does not go on faster than its products can be utilized in other reactions, and this is accomplished in the present case by retarding the sodium reaction through the gradual addition of the ethyl acetate.

This process may be varied by employing catalysts for the reduction, ether being the preferred catalyst for the reaction given, and 1 part by weight giving good results. Other hydrogenizing agents such as the alkyl esters, amyl acetate, ethyl acetate and butyl formate, with or without water may be employed, especially with a catalyst such as aniline; and ethyl alcohol may be employed, especially when used with ether as a catalyst. Other alkyl chlorides such as amyl chloride and butyl chloride may be used to form the corresponding lead alkyls.

When the boiling point of the alkyl chloride is relatively high the reaction may be carried on at atmospheric pressure the temperature preferably being slightly below the boiling point of the alkyl chloride. When the reactions are carried on at low temperatures the rate of thermal decomposition of lead diethyl is reduced and the temperature of the lead diethyl may be raised to increase the rate of decomposition and shorten the time of the reaction.

Slight alkalinity promotes the reaction and this alkalinity may be produced by adding a small amount of NaOH to the reaction mass.

I claim:

1. The process of producing a lead tetra alkyl which comprises mixing lead and an alkyl chloride and reducing with nascent hydrogen the reaction mass thus formed.

2. The process of producing a lead tetra alkyl which comprises mixing lead, an alkyl chloride and a substance adapted to liberate active hydrogen, liberating active hydrogen from the said substance and reducing the reaction mass.

3. The process of producing a lead tetra alkyl which comprises mixing a sodium lead alloy and an alkyl chloride, and adding thereto a substance adapted to react with the sodium to yield nascent hydrogen.

4. A process as described in claim 3 in which a reduction catalyst is used.

5. A process as described in claim 3 in which the alkyl chloride is ethyl chloride and lead tetra ethyl is formed.

6. A process as described in claim 3 in which the hydrogen yielding substance is an alkyl ester.

7. A process as described in claim 3 in which the hydrogen-yielding substance is ethyl acetate.

8. A process as described in claim 3 in which reaction in the liquid phase is produced at a temperature above the boiling point of the alkyl halide by a temperature pressure control.

9. A process as described in claim 3 in which the hydrogen yielding substance is added slowly to the reaction mass.

10. The process of producing lead tetra ethyl which comprises mixing a sodium lead alloy, ethyl chloride and ethyl acetate, and heating the reaction mass thus formed in a closed vessel.

11. A process as described in claim 10 in which the ethyl acetate is added slowly.

12. A process as described in claim 10 in which a reduction catalyst is used.

13. A process as described in claim 10 in which ether is added.

14. The process of producing a lead tetra alkyl which comprises mixing a sodium lead alloy, an alkyl chloride and a hydrogenizing substance, and heating the reaction mass thus formed in a closed vessel under pressure.

In testimony whereof I hereto affix my signature.

MERRILL ARTHUR YOUTZ.